(12) United States Patent  
Ghannam et al.

(10) Patent No.: US 8,690,208 B2
(45) Date of Patent: Apr. 8, 2014

(54) PRESSURE-BASED CRASH DETECTION SYSTEM INCORPORATED IN SIDE RAIL

(71) Applicant: Ford Global Technologies, LLC, Dearborn, MI (US)

(72) Inventors: Mahmoud Y. Ghannam, Canton, MI (US); Todd N. Clark, Dearborn, MI (US); Eric L. Stratten, Plymouth, MI (US); Swadad A. Carremm, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/762,778

(22) Filed: Feb. 8, 2013

(65) Prior Publication Data

US 2013/0154284 A1    Jun. 20, 2013

Related U.S. Application Data

(62) Division of application No. 12/913,872, filed on Oct. 28, 2010, now Pat. No. 8,398,133.

(51) Int. Cl.
*B60R 19/34* (2006.01)

(52) U.S. Cl.
USPC .......................................................... 293/133

(58) Field of Classification Search
USPC ................ 296/65.05, 65.01, 65.03, 65.09;
297/378.12, 15, 322, 342, 344.15, 331,
297/334, 341, 366; 248/421, 429
See application file for complete search history.

(56) References Cited

U.S. PATENT DOCUMENTS

| 3,912,295 | A | * | 10/1975 | Eggert, Jr. ..................... 280/784 |
| 3,974,350 | A | * | 8/1976 | Breed ......................... 200/61.53 |
| 4,428,599 | A | * | 1/1984 | Jahnle ............................ 280/784 |
| 4,431,221 | A | * | 2/1984 | Jahnle ............................ 293/122 |
| 5,311,963 | A | * | 5/1994 | Shigeoka et al. .............. 180/274 |
| 5,346,276 | A | * | 9/1994 | Enning et al. ............. 296/203.02 |
| 5,364,158 | A | * | 11/1994 | Watanabe et al. ......... 296/187.09 |
| 5,611,568 | A | * | 3/1997 | Masuda ......................... 280/784 |
| 5,732,801 | A | * | 3/1998 | Gertz ............................. 188/377 |
| 5,876,077 | A | * | 3/1999 | Miskech et al. ............... 293/132 |
| 6,065,786 | A | * | 5/2000 | Wheatley ...................... 293/109 |
| 6,152,521 | A | * | 11/2000 | Hayashi et al. .......... 296/187.09 |
| 6,212,456 | B1 | | 4/2001 | Stride |
| 6,361,092 | B1 | * | 3/2002 | Eagle et al. ................... 293/102 |
| 6,561,301 | B1 | | 5/2003 | Hattori et al. |
| 6,637,788 | B1 | | 10/2003 | Zöllner et al. |
| 6,942,202 | B2 | * | 9/2005 | Kienholz ................. 267/140.14 |
| 7,308,380 | B2 | | 12/2007 | Tanabe |
| 7,429,916 | B2 | | 9/2008 | Kiribayashi |
| 7,445,072 | B2 | * | 11/2008 | Mattes et al. ................. 180/274 |

(Continued)

FOREIGN PATENT DOCUMENTS

JP    2009018735 A2    1/2009

*Primary Examiner* — Kiran B Patel
(74) *Attorney, Agent, or Firm* — Jason Rogers; MacMillan, Sobanski & Todd, LLC

(57) ABSTRACT

A vehicular crash sensing system includes a bumper cap for contacting a bumper. A chamber fits into a side rail attached to the bumper, the chamber being sealed by the bumper cap. A stop element limits movement of the chamber into the side rail. A pressure sensor detects an increased chamber air pressure during crushing of the chamber resulting from movement of the bumper with respect to the stop element.

8 Claims, 5 Drawing Sheets

(56) References Cited

U.S. PATENT DOCUMENTS

| | | | |
|---|---|---|---|
| 7,637,545 B2 | 12/2009 | Takahashi et al. | |
| 7,911,331 B2 * | 3/2011 | Tanabe | 340/436 |
| 8,128,140 B2 * | 3/2012 | Tanabe | 293/117 |
| 2008/0173107 A1 * | 7/2008 | Leach et al. | 73/865.3 |
| 2008/0211646 A1 * | 9/2008 | Cech et al. | 340/436 |
| 2009/0015391 A1 * | 1/2009 | Kiribayashi | 340/436 |
| 2009/0015392 A1 * | 1/2009 | Takahashi et al. | 340/436 |
| 2009/0167300 A1 * | 7/2009 | Cech et al. | 324/239 |
| 2009/0312949 A1 | 12/2009 | Suzuki et al. | |
| 2011/0042975 A1 * | 2/2011 | Faruque | 293/118 |

* cited by examiner

PRESSURE-BASED CRASH DETECTION SYSTEM INCORPORATED IN SIDE RAIL

CROSS REFERENCE TO RELATED APPLICATIONS

This is a divisional application of U.S. application Ser. No. 12/913,872, filed Oct. 28, 2010.

STATEMENT REGARDING FEDERALLY SPONSORED RESEARCH

Not Applicable.

BACKGROUND OF THE INVENTION

The present invention relates in general to crash sensing in motor vehicles, and, more specifically, to pressure-based sensing having a pressure chamber location that enables low cost components and avoids negatively impacting other vehicle structures or systems.

Active restraint systems utilize one or more sensors to detect the occurrence of a crash in order to deploy air bags or other restraint or occupant protection devices. Sensor signals are sent to an electronic control module that monitors the signals and determines when conditions warrant activation or deployment of an air bag, for example.

The most commonly used type of sensor is the accelerometer which responds to gravitational forces occurring during deceleration associated with a crash. The accelerometer has a small size, so that it has a minimal effect on the mechanical crash performance of the structures to which it is mounted. In some situations, however, an accelerometer may not perform well because of the nature of the movements of the vehicle structure to which it is mounted both prior to and during a crash. Depending on the transmission of loads, deformation, and other structural issues, certain positions on a vehicle frame wherein an accelerometer might be mounted can be subject to vibrational resonance or other motions that interfere with sensing of the overall vehicle movement. This issue is sometimes addressed by mounting extra struts to the vehicle frame in order to either create an acceptable location for an accelerometer or to modify vibrational resonance in the frame, but such struts may interfere with the intentionally-controlled deformation of vehicle structures during a crash, may be difficult or impossible to package in the available space, or may be too costly. Consequently, other types of crash sensors are also sometimes used.

A different type of known crash sensor directly senses an impact. Examples of impact sensors include a moving ball sensor and a deforming chamber sensor. In a deforming chamber sensor, a pressure or temperature of a fluid (e.g., air) in a chamber being compressed or crushed during a crash can be monitored to detect a deformation. Such impact sensors typically have a greater size, so that it may be even harder to find a good packaging space with sufficient clearance. Known uses of deforming chamber sensors have been especially subject to the problem of the creation of unintended changes in the controlled deformation during a crash.

It would be desirable to provide a pressure-based crash system that 1) does not add strength to the front vehicle frame structure, 2) uses components that can withstand paint oven temperatures without degradation, 3) functions over a wide temperature range, and 4) is easily assembled with low cost components.

SUMMARY OF THE INVENTION

In one aspect of the invention, a vehicular crash sensing system is provided wherein a bumper cap contacts a bumper. A chamber is at least partially fit into a side rail attached to the bumper, wherein the chamber is sealed by the bumper cap. The bumper cap and chamber together enclose a space containing a volume of air. A stop element limits movement of the chamber into the side rail. The location of the seam between the bumper cap and chamber (i.e., whether or not the bumper cap is smaller or larger than the chamber part or how much of the bumper cap extends into the side rail) can be adjusted to facilitate manufacturing of the parts. A pressure sensor detects an increased chamber air pressure during crushing of the chamber resulting from movement of the bumper with respect to the stop element.

DETAILED DESCRIPTION OF PREFERRED EMBODIMENTS

Figure 1:
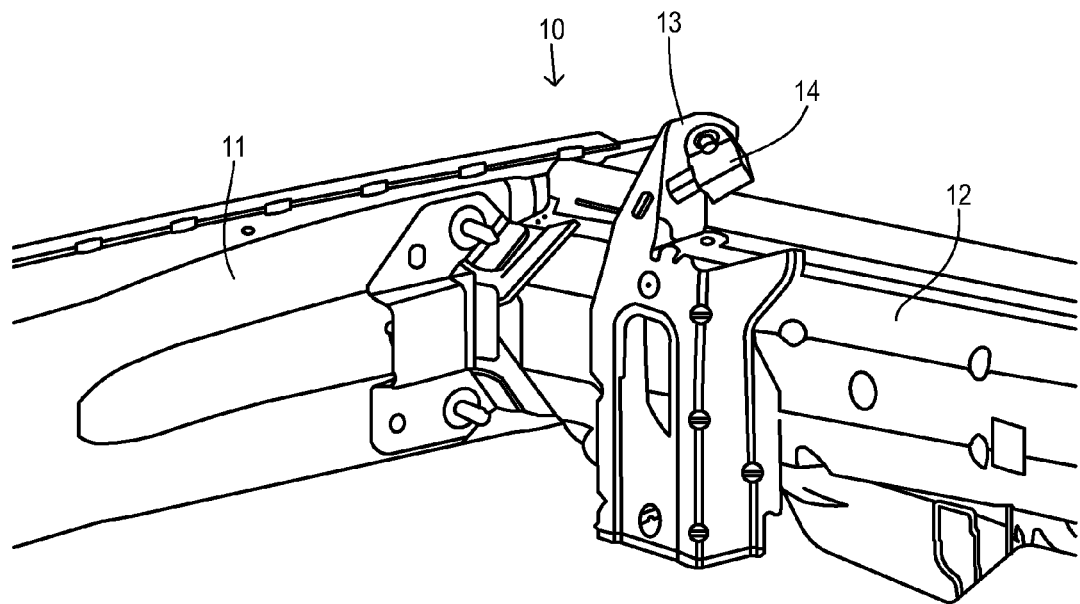
FIG. 1 is a perspective view of a prior art placement of an accelerometer on a bumper/side rail system, and also showing a hollow side rail that provides a space for mounting a deformation-type crash sensor in a first embodiment of the present invention.

Referring to FIG. 1, a vehicle frame system 10 includes a front bumper beam 11 and a side rail 12. Side rail 12 is joined approximately perpendicularly to bumper 11 by conventional means, which in this example includes a bracket 13. An accelerometer-based crash sensor 14 is shown mounted at one potential location on frame system 10. For some vehicle designs, it may not be feasible to install an accelerometer-based sensor in any convenient location on the frame without signal degradation from vibrational resonances unless undesirable structural changes are made (e.g., adding a strut). In some embodiments, the present invention uses an open space behind the bumper beam inside the side rail for mounting a deforming chamber-type sensor.

Figure 2:
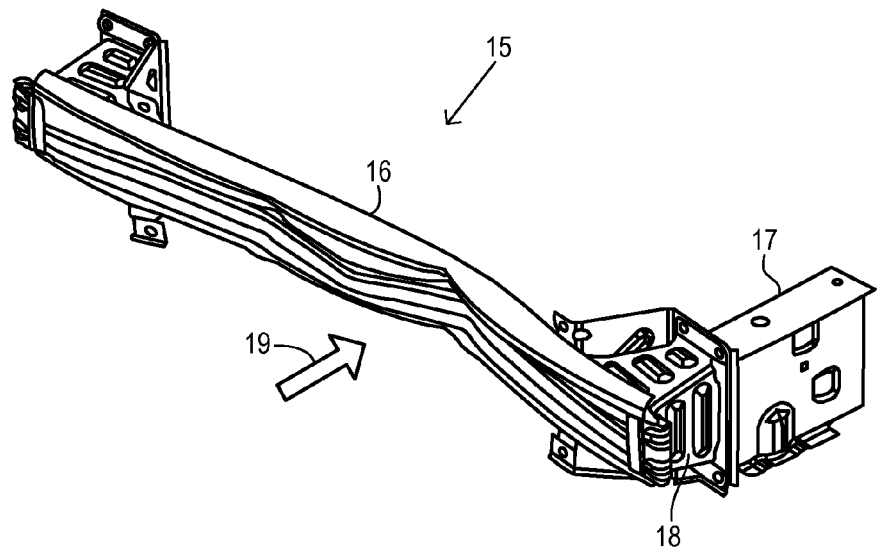
FIG. 2 is a perspective view of a prior art bumper/side rail system using a crush can into which the crash sensing system of the present invention can alternatively be placed.

FIG. 2 shows an alternate prior art frame system 15 having a bumper 16 and a side rail 17. A crush can 18 joins bumper 16 and side rail 17. The sensor described in the following figures can also be readily adapted by one skilled in the art for placement inside crush can 18. In a collision, frame system 15 (including crush can 18) may deform in response to a crash force 19.

Figure 3:
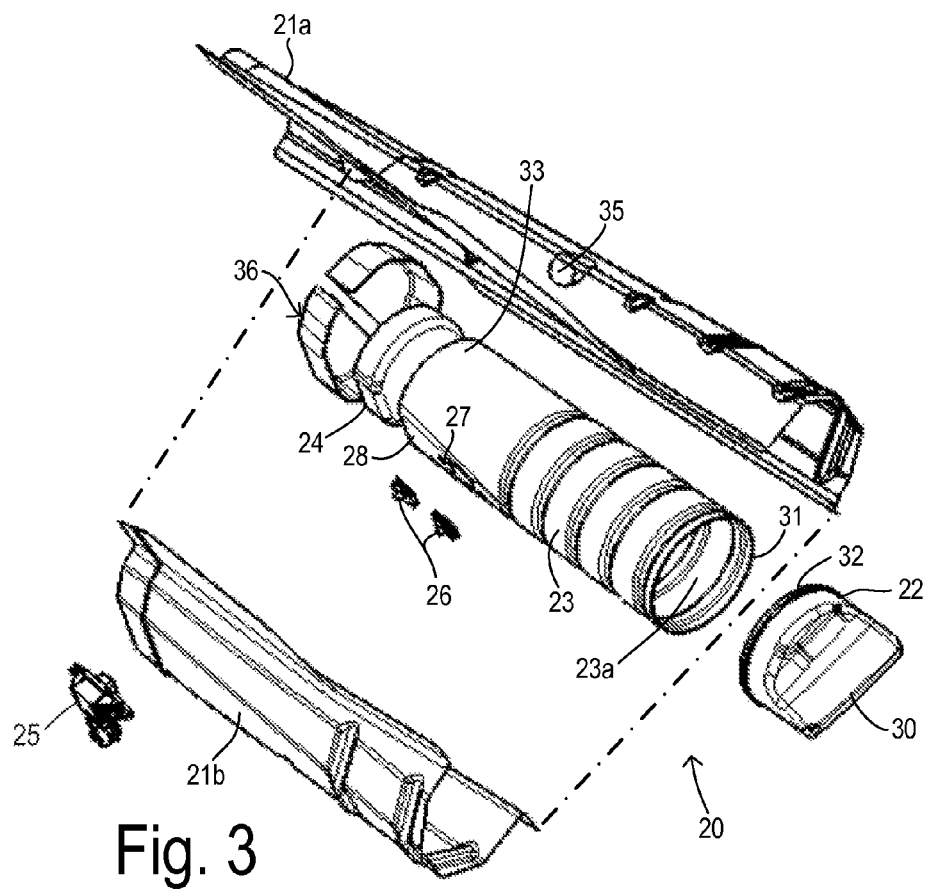
FIG. 3 is an exploded view of a first embodiment of a crash sensing system mounted in a side rail.

FIG. 3 is an exploded view of a crash sensor system 20 received inside a side rail (which may be part of any frame system such as those shown in FIG. 1 or 2, and which is referred to herein as a second frame member) comprised of rail members 21a and 21b. Sensor system 20 includes a bumper cap 22, an elongated chamber 23, and a reaction cap 24. A pressure sensor (i.e., fluid sensor) 25 is mounted using fasteners 26 to a side of chamber 23 within a side opening 27. Elongated chamber 23 may be generally cylindrical and may contain a flattened facet 28 to provide a flat surface for side opening 27 and pressure sensor 25.

Bumper cap 22 has a first end surface 30 that is shaped in such a way that it nests into a contoured surface of a bumper. Chamber 23 is formed by an outer wall 23a, the major portion of which is sized to be received in the hollow side rail (i.e., second frame member). Chamber 23 has an end opening 31 to receive a second end 32 of bumper cap 22 (e.g., by interference fit, threading, or welding). End opening 31 and bumper cap 22 have a matching cylindrical shape so that bumper cap 22 substantially seals end opening 31. Other non-cylindrical matching shapes can be employed as discussed below with reference to FIG. 9.

Reaction cap 24 substantially closes a second end 33 of chamber 23 so that when chamber 23 is crushed by forces applied through bumper cap 22, an increasing air pressure is created inside chamber 23 which is converted by pressure sensor 25 into an electrical signal that is transmitted to a controller (not shown) for determining whether a crash is in progress. Reaction cap 24 is a plate-like or disc-like member and is mounted against an inside surface of the outer wall of chamber 23. It can be joined by an interference fit, welding, or may be integrally formed with chamber 23. In one preferred embodiment, bumper cap 22, chamber 23, and reaction cap 24 may be all comprised of stamped sheet metal. Alternatively, they could be comprised of molded plastic or reinforced rubber.

Either reaction cap 24 or chamber 23 has a stop surface 29 at the farthest point from the bumper in order to interface with a corresponding side rail feature for limiting movement of chamber 23 axially into the side rail. If reaction cap 24 is inserted fully into chamber 23, then the back end of chamber 23 may provide the stop surface. If reaction cap 24 extends out from chamber 23, then it would provide the stop surface. The stop surface abuts a reaction surface that is stationary with respect to the side rail. The reaction surface may be provided by an intrusion integrally formed in the side rail, such as a stamped rib or dimple 35 in rail member 21A. Alternatively, the reaction surface may be provided by a bracket 36 fixed to the side rail and crossing the hollow interior space of the side rail. Bracket 36 may be cup shaped, may be comprised of multiple sections, and may be joined with side rail members 21a and 21b by welding, for example.

Figure 4:
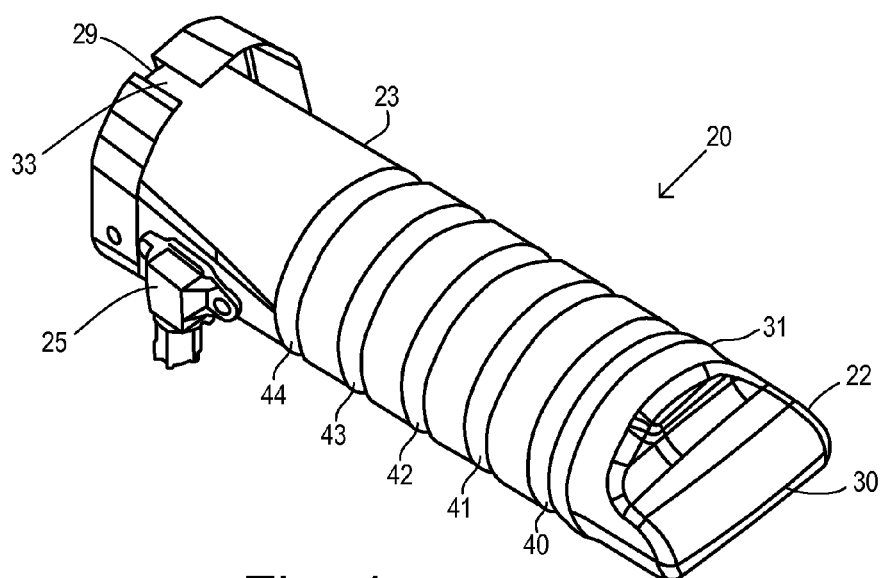
FIG. 4 is a perspective view of the assembled crash sensing system of FIG. 3.

FIG. 4 shows sensor system 20 in its assembled state. In a preferred embodiment, chamber 23 includes a plurality of circumferential grooves 40-44 that reduce the resistance of chamber 23 to being crushed in its longitudinal direction (i.e., from the direction of bumper cap 22). Preferably, the circumferential grooves are concentrated toward first end 31 so that the axial crushing (created when the bumper is forced inward) is concentrated toward the front of chamber 23.

Figure 5:
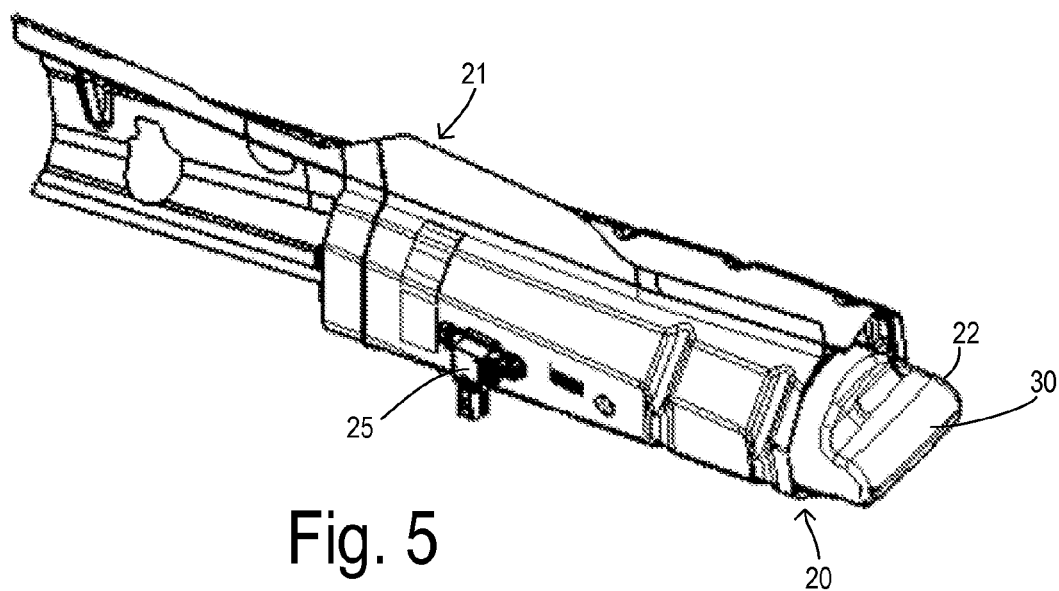
FIG. 5 is a perspective view of the system of FIGS. 3 and 4 with the side rail assembled.
Figure 6:
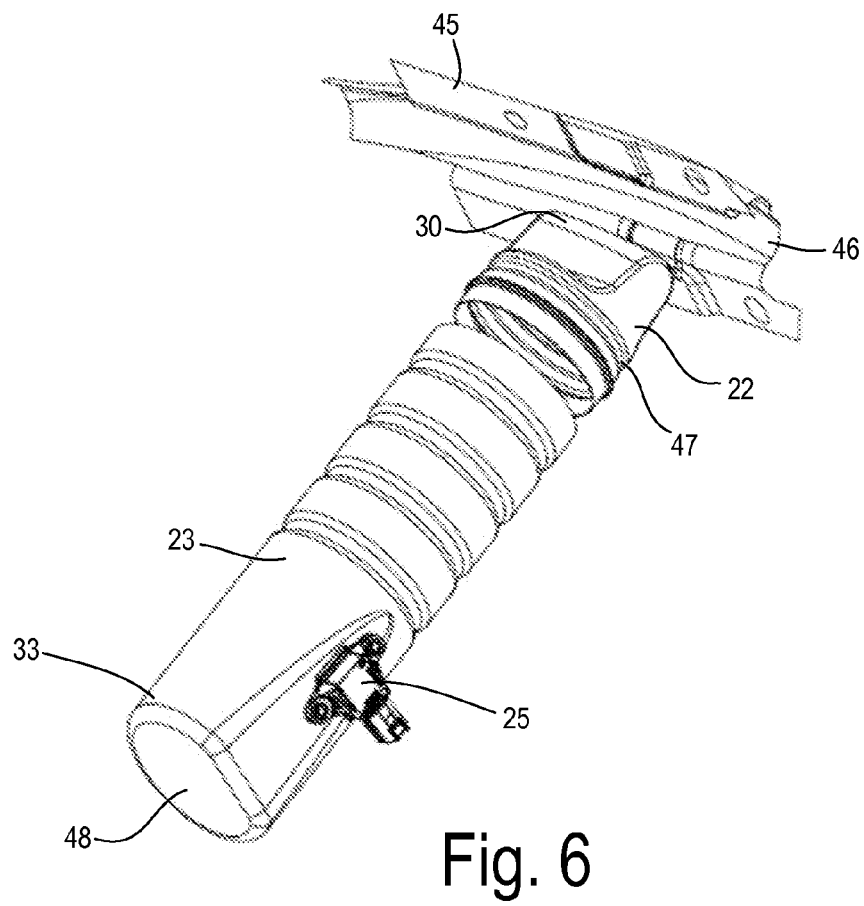
FIG. 6 is a perspective, partially-exploded view of the crash sensing system with a bumper.
Figure 7:
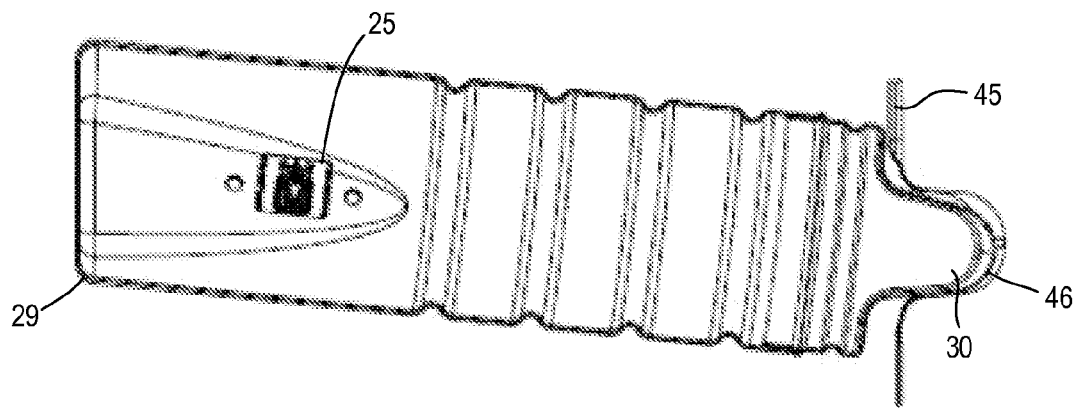
FIG. 7 is a side view showing the crash sensing system interfaced against the bumper.
Figure 8:
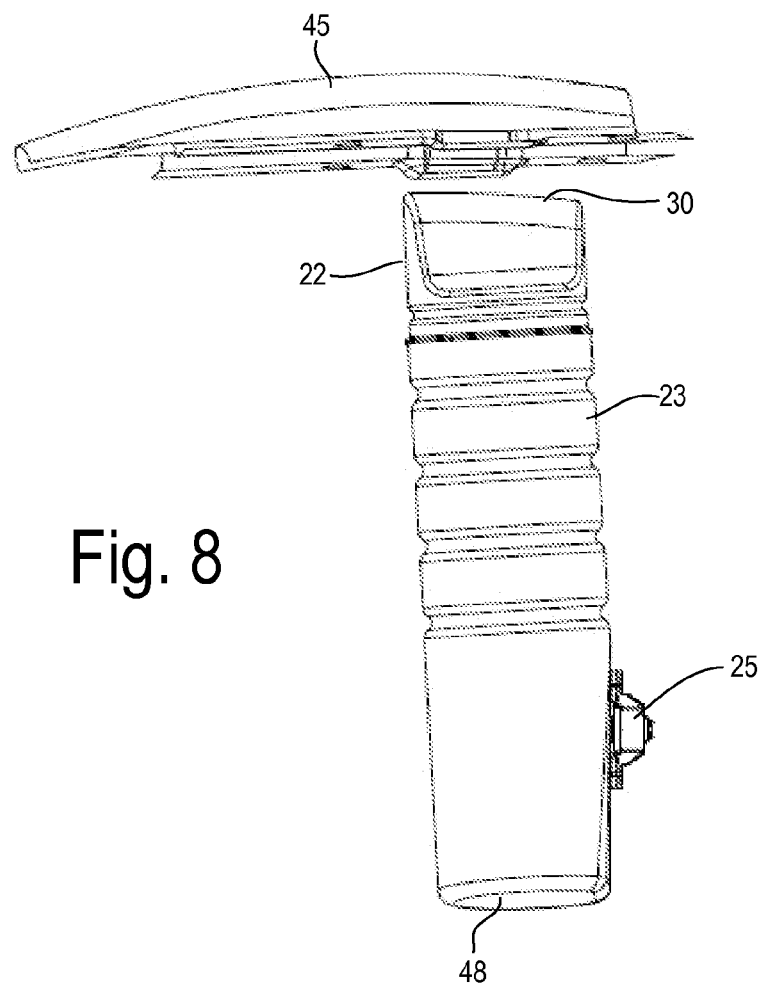
FIG. 8 is a top view of a crash sensing system and a bumper.

FIG. 5 illustrates sensor system 20 mounted into side rail 21 with bumper cap 22 extending outward for contact with a bumper. FIG. 6 shows a rear perspective view wherein a bumper 45 (referred to herein as a first frame member) has a contoured central groove 46. Bumper cap 22 is formed so that its front end surface 30 has a shape that nests into (i.e., conforms with) groove 46. As shown in FIG. 6, bumper cap 22 may also be provided with a circumferential groove 47. Alternatively, an even greater portion of the longitudinal length of the chamber assembly may be provided by bumper cap 22 to facilitate manufacture of the parts by drawing or stamping, for example. FIGS. 6-8 also show a two-piece chamber assembly wherein the "reaction cap" is integrally formed as back end 48 of chamber 23.

FIG. 7 is a side view showing the placement of first end surface 30 into groove 46 after the side rail (not shown) is joined to bumper 45. Stop surface 29 is shown at the opposite end of the chamber. As shown in FIG. 8, first end surface 30 may also be tapered (e.g., in a direction perpendicular to the longitudinal axis of chamber 23) to accommodate any curvature of bumper 45.

Figure 9:
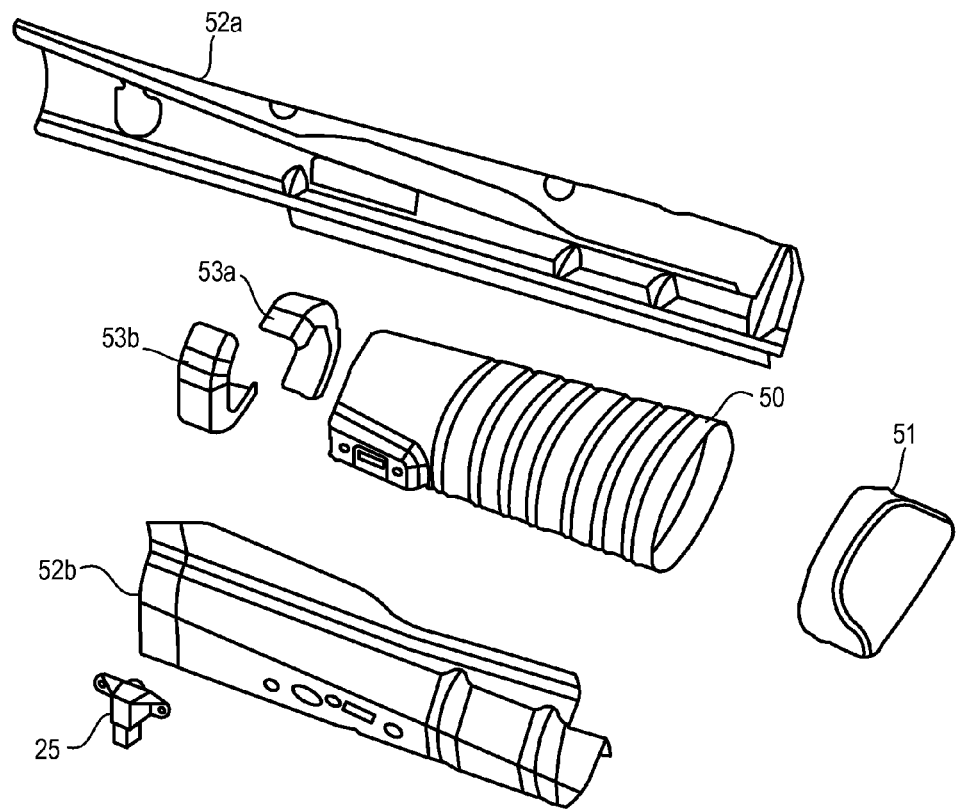
FIG. 9 is an exploded view of another embodiment of the crash sensing system.

FIG. 9 shows an alternative embodiment wherein the hollow space within the side rail and the outer profile of the sensor system are non-cylindrical. Thus, a chamber 50 and bumper cap 51 may have an oval outer profile to match a hollow space created by side rail members 52a and 52b with a similar profile. A bracket comprised of bracket members 53a and 53b is sized to mate with side rail members 52a and 52b and to chamber 50 so as to limit movement of chamber 50 into the side rail. A non-cylindrical profile can reduce any tendency of the sensor system to rotate inside the side rail and tends to reduce noise and rattling. FIG. 9 is also constructed as a two-piece unit without a separate reaction cap.

Figure 10:
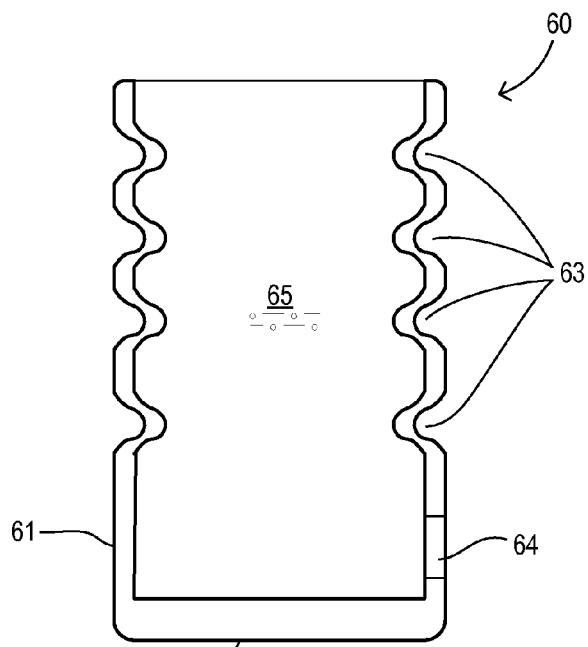
FIG. 10 is a cross-sectional view of an alternative embodiment of a chamber of the present invention.

As shown in cross-section in FIG. 10, a chamber 60 may include an integrated outer wall 61 and reaction cap 62. The integrated structure may be fabricated using molded materials. Grooves 63 and a side opening 64 would preferably be included in a molded structure. Outer wall 61 contains a quantity of air 65 for which the fluid properties (e.g., pressure) change during deformation.

The foregoing invention has provided an integrated bumper-side rail pressure signal device of low cost that generates a pressure signal with a fast response time, high signal quality, and low noise. The device can be used on many types of vehicle and structural elements. No additional packaging is required because the sensing system is mounted in an otherwise empty space behind the bumper and in the side rail or crush can.

What is claimed is:

1. A vehicular crash sensing system, comprising:
   a bumper cap for contacting a bumper;
   a chamber for fitting into a side rail attached to the bumper, the chamber being sealed by the bumper cap;
   a stop element limiting movement of the chamber into the side rail; and
   a pressure sensor for detecting an increased chamber air pressure during crushing of the chamber resulting from movement of the bumper with respect to the stop element.

2. The system of claim 1 wherein the stop element is comprised of an intrusion integrally formed in the side rail.

3. The system of claim 1 wherein the stop element is comprised of a bracket mounted across a hollow interior space of the side rail.

4. The system of claim 1 wherein the chamber comprises a plurality of circumferential grooves for reducing resistance to being crushed in the longitudinal direction.

5. The system of claim 4 wherein the circumferential grooves are concentrated toward an end of the chamber receiving the bumper cap.

6. The system of claim 1 wherein the chamber is substantially cylindrically shaped.

7. The system of claim 6 wherein the chamber comprises a flattened facet proximate to the stop element and having a side opening formed therein for receiving the pressure sensor.

8. The system of claim 1 wherein the chamber includes a reaction cap for sealing the chamber at an end of the chamber proximate to the stop element.

\* \* \* \* \*